US011108899B2

(12) United States Patent
Shani et al.

(10) Patent No.: US 11,108,899 B2
(45) Date of Patent: *Aug. 31, 2021

(54) WLAN DEVICE WITH PREAMBLE DECODE-BASED RECEIVE SUSPEND DURING UNDESIRED PACKETS

(71) Applicant: Texas Instruments Incorporated, Dallas, TX (US)

(72) Inventors: Oren Aharon Shani, Kfar Saba (IL); Matan Yacobi, Karmey Yosef (IL)

(73) Assignee: Texas Instmments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,784

(22) Filed: Feb. 7, 2020

(65) Prior Publication Data

US 2020/0177711 A1 Jun. 4, 2020

Related U.S. Application Data

(63) Continuation of application No. 16/285,924, filed on Feb. 26, 2019, now Pat. No. 10,601,964, which is a (Continued)

(51) Int. Cl.
*H04L 29/06* (2006.01)
*H04W 74/08* (2009.01)
(Continued)

(52) U.S. Cl.
CPC ......... *H04L 69/22* (2013.01); *H04W 52/0235* (2013.01); *H04W 74/0808* (2013.01); *H04W 84/12* (2013.01); *Y02D 30/70* (2020.08)

(58) Field of Classification Search
CPC ..... H04L 69/22; H04L 43/02; H04L 47/2483; H04W 52/0235; H04W 74/0808; H04W 84/12; H04W 52/0274; Y02D 30/70
See application file for complete search history.

(56) References Cited

U.S. PATENT DOCUMENTS 6,628,675 B1 * 9/2003 Neufeld ............. H04B 1/70756
370/280
7,403,511 B2 7/2008 Liang
(Continued)

OTHER PUBLICATIONS

Ko, G., "Intra-PPDU Power Save for a Multiple BSSID Set Case," IEEE 802.11-16/1204r0, Sep. 2016, 6 pages.

*Primary Examiner* — Ian N Moore
*Assistant Examiner* — Latresa A McCallum
(74) *Attorney, Agent, or Firm* — Brian D. Graham; Charles A. Brill; Frank D. Cimino

(57) ABSTRACT

A WLAN device includes a processor implementing a MAC layer and a PHY layer which is coupled to a transceiver including a receive (Rx) chain and a transmit (Tx) chain that is coupled to an antenna. A preamble decode-based receive suspend algorithm has software stored in a memory that is implemented by the processor or by hardware including digital logic. The algorithm responsive to receiving a packet including a Physical Layer Convergence Protocol (PLCP) header, a MAC header, and data, is for analyzing a length field in the PLCP header to determine whether the packet is an undesignated packet and whether there is sufficient time remaining for implementing a turning off and then back on of an analog portion of the Rx chain to avoid missing a next packet. If the undesignated packet and sufficient time are present, the analog portion of the Rx chain is turned off.

20 Claims, 3 Drawing Sheets

Related U.S. Application Data continuation of application No. 15/428,700, filed on Feb. 9, 2017, now Pat. No. 10,257,326.

(51) Int. Cl.
*H04W 52/02* (2009.01)
*H04W 84/12* (2009.01)

(56) References Cited

U.S. PATENT DOCUMENTS

| | | | |
|---|---|---|---|
| 7,532,625 B2 | 5/2009 | Schucke | |
| 8,442,074 B1 * | 5/2013 | Goodson | H04J 3/0664 370/503 |
| 8,891,497 B1 * | 11/2014 | Vleugels | H04W 84/22 370/338 |
| 2003/0118132 A1 * | 6/2003 | Williams | H04W 52/0225 375/343 |
| 2006/0014496 A1 | 1/2006 | Klein | |
| 2006/0072614 A1 * | 4/2006 | Ogiso | H04W 52/0225 370/474 |
| 2006/0149878 A1 * | 7/2006 | Carmichael | G06F 13/24 710/263 |
| 2006/0176968 A1 * | 8/2006 | Keaney | H03M 13/3961 375/260 |
| 2008/0014934 A1 | 1/2008 | Balasubramanian | |
| 2013/0107912 A1 | 5/2013 | Ponnampalam | |
| 2015/0110058 A1 | 4/2015 | Shapira | |
| 2016/0242115 A1 * | 8/2016 | Jafarian | H04W 52/0225 |

* cited by examiner

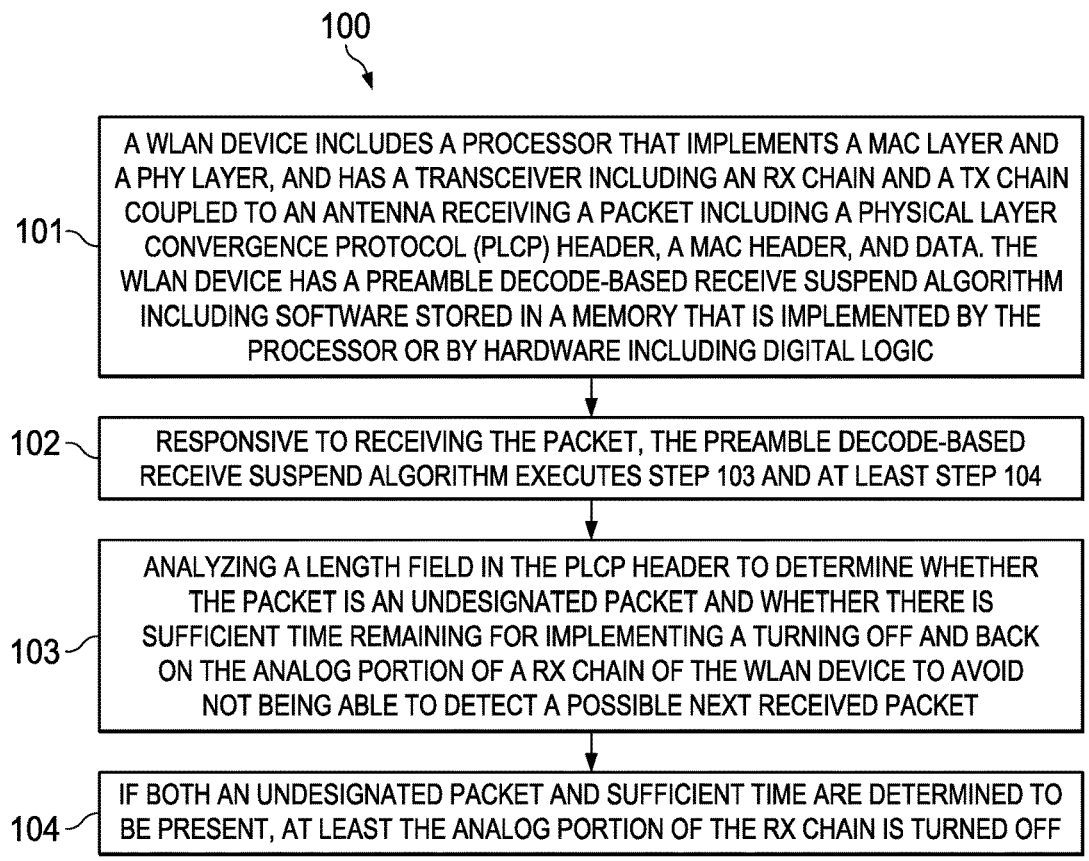
FIG. 1
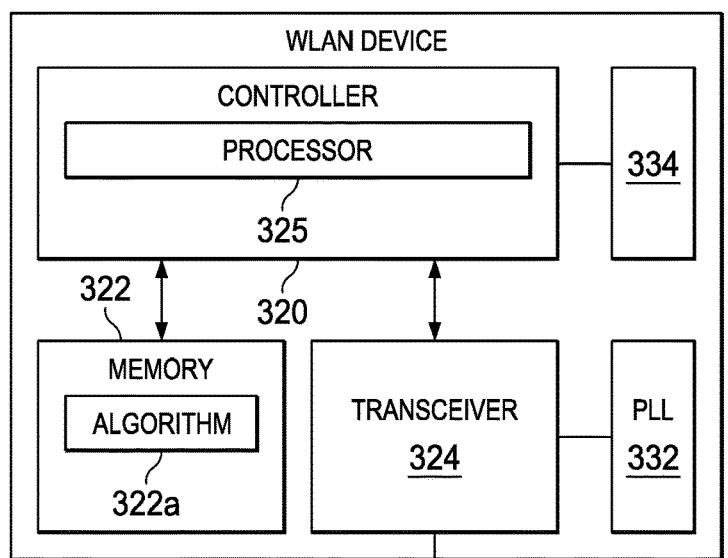
FIG. 3

WLAN DEVICE WITH PREAMBLE DECODE-BASED RECEIVE SUSPEND DURING UNDESIRED PACKETS

This application is a continuation application of U.S. patent application Ser. No. 16/285,924 filed Feb. 26, 2019, which is a continuation of U.S. patent application Ser. No. 15/428,700 filed Feb. 9, 2017 (now U.S. Pat. No. 10,257, 326), which Applications are hereby incorporated herein in their entireties. Disclosed embodiments relate generally to wireless communication systems, and more particularly to a power efficient wireless local area network (WLAN) device.

FIELD

Background

IEEE 802 refers to a family of IEEE standards dealing with Local Area Networks and Metropolitan Area Networks. IEEE 802.11 is a set of medium access control (MAC, or Data Link) layer and physical layer (PHY) specifications for implementing WLAN communication. The 802.11 family is a series of over-the-air modulation techniques that share the same basic protocol. The PHY layer and MAC layer reside in the Open Systems Interconnection (OSI) stack or the OSI 7 layer model, where Layer-1 is known as the PHY layer and Layer-2 is known as the MAC layer.

Functions of PHY layer include converting MAC layer format suitable to be transported over the medium, adds forward error correction functionality to enable error correction at the receiver, and adds modulation and demodulation modules to incorporate modulation and demodulation functionalities. This will convert bits into symbols for long distance transmission as well as to increase bandwidth efficiency.

The functions of the MAC layer include incorporating a MAC header at the start of upper layer IP packet and cyclic redundancy check (CRC) at the end of IP packet. The MAC header includes a packet length field which helps the receiver know about the total length of packet it is going to receive. The CRC helps in error detections and helps the receiver know whether received packet is erroneous or not. WLAN chipsets and equipment have seen widespread market adoption in recent years. The WLAN market has been mostly driven in the corporate market by the laptop users for its convenience of untethered connectivity, and driven in the home market for home networking purposes such as sharing of broadband connections among multiple PCs. Due to the relatively large power capacity of a laptop computer battery and relatively low expectations from users (typically about 4-6 hours of uninterrupted usage between charges is acceptable), the power consumption of WLAN devices has been relaxed compared with cellular wireless devices.

As the WLAN market matures and the cost of WLAN devices rapidly decreases, there is interest regarding the incorporation of WLAN capability into portable devices, such as cell phones and PDAs. Most of these portable devices are battery powered, and end users generally expect at least a few days of continuous use between battery charges. Power efficiency can thus be important for WLAN devices.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize for conventional WLAN devices the Rx chain (its analog and digital portions) is always consuming power and is not turned off (or suspended) even while receiving undesignated packets which can be a frequent event in congested environments. Undesignated packets as used herein are packets that cannot be successfully fully decoded by the WLAN device including unsupported WLAN protocols or unsupported channel rates, or packets that can be successful decoded but have the wrong destination address.

WLAN has expanded into a wide range of different protocols, such as IEEE 802.11b, g, n, ac, ax, and ah. It is recognized legacy WLAN devices which do not support advanced protocols can only decode the lower rate preamble of the packets as both the Physical Layer Convergence Protocol (PLCP) preamble and PLCP header are at the lowest PHY rate and therefore can be decoded, but cannot decode the higher rate MAC header or the data. Inability to decode the MAC header and the data also generally happens for a WLAN device tuned to a lower frequency channel, such as a 20 MHz channel, when the received packet is a higher rate channel, such as a 40 MHz channel. In that case it is recognized that the 20 MHz tuned device will only be able to decode the lower rate PLCP header (e.g., @ 1DSSS or 6 OFDM (Orthogonal Frequency Division Multiplexing), but not the higher rate MAC header or the data (e.g., MCS15).

Disclosed embodiments include preamble decode-based receive suspend algorithms which analyze the length field in the PLCP header of the packet to determine when to implement turn Rx chain off which is recognized to always be in the lowest basic rate, thus generally being supported by all WLAN devices. In disclosed Rx chain turn off a portion of the Rx chain comprising the analog portion and/or digital portion of the Rx chain is turned off in the case of undesignated packets received provided other conditions described below are met. Once recognized as an undesignated packet the digital portion can generally always be suspended because its turn off/on time is minimal. However, turning off the analog portion is more complex because the algorithm needs to verify there is enough time for turning it off and back on in time to avoid missing a new received packet.

Disclosed use of the length field in the PLCP header of the packet being in the lowest basic rate is generally supported by all WLAN devices and allows the device to turn off a portion of the Rx chain of the WLAN device for unsupported rates/bandwidths. In disclosed approaches because the Rx chain off period is calculated based on the PLCP length field which has already gone through error detection of the PLCP itself (using the PLCP CRC, as there is generally a Gbit CRC for IEEE802.11b and a 1 bit parity bit for OFDM), disclosed approaches are reliable since it is always transmitted at the lowest supported rate (unlike the MAC header).

Disclosed embodiments thus introduce a significant improvement to the power consumption of a WLAN device in a congested environment by saving the Rx power spent on the processing of undesignated WLAN packets including for unsupported rates/bandwidths. Upon WLAN packet detection, an early decision mechanism is implemented based on the PLCP length field to turn off a portion of the Rx chain to cut off the reception of WLAN packets that are undesignated for to the WLAN device. The turning off of the Rx chain portion thus saves this power, while still waking up on time to receive the next packets and to avoid Tx during the time of the suspended packet.

Disclosed embodiments include a WLAN device which includes a controller having a processor coupled to a memory implementing a MAC layer and a PHY layer which is coupled to a transceiver including a Rx chain including an analog and digital portion and a Tx chain that is coupled to an antenna. A preamble decode-based receive suspend algorithm can comprise code stored in a memory that is implemented by the processor which runs the algorithm, or can also generally be implemented by hardware to free the processor, typically by dedicated hardware (Field Programmable Gate Array (FPGA) or Application Specific Integrated Circuit (ASIC)). The algorithm responsive to receiving a packet including a PLCP header, a MAC header, and data, is for analyzing a length field in the PLCP header to determine whether the packet is an undesignated packet and whether there is sufficient time remaining for implementing a turning off and back on of the analog portion of the Rx chain to avoid missing a new received packet.

If both the undesignated packet and sufficient time are present, at least the analog portion of the Rx chain is turned off. The digital portion of the Tx chain will generally be turned off in the case the packet is undesignated regardless of the packet time left.

BRIEF DESCRIPTION OF THE DRAWINGS

Reference will now be made to the accompanying drawings, which are not necessarily drawn to scale, wherein:

FIG. 1 is a flow chart showing steps for an example an example method of power conservation for a WLAN device using preamble decode-based Rx chain suspension, according to an example embodiment.

FIG. 3 shows an example WLAN device that can implement disclosed methods of PLCP length field-based Rx chain shutdown for undesignated packets for power conservation.

DETAILED DESCRIPTION

Figure 2A:
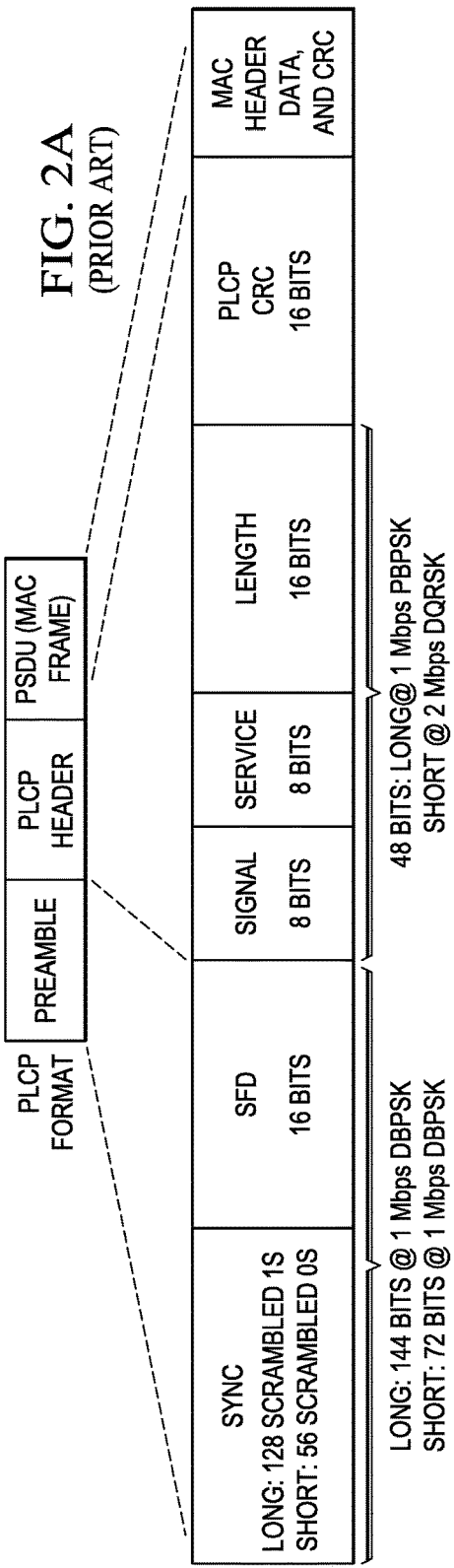
FIG. 2A shows the packet structure for an IEEE 802.11b packet.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 shows an example method 100 of power conservation for a WLAN device using disclosed preamble decode-based receive suspend during undesired packets, according to an example embodiment. The WLAN device implements a MAC layer and a PHY layer, and has a transceiver including an Rx chain comprising a digital portion and an analog portion, and a Tx chain coupled to an antenna. Step 101 comprises the receiving a packet including a PLCP header, a MAC header, and data.

Figure 2B:
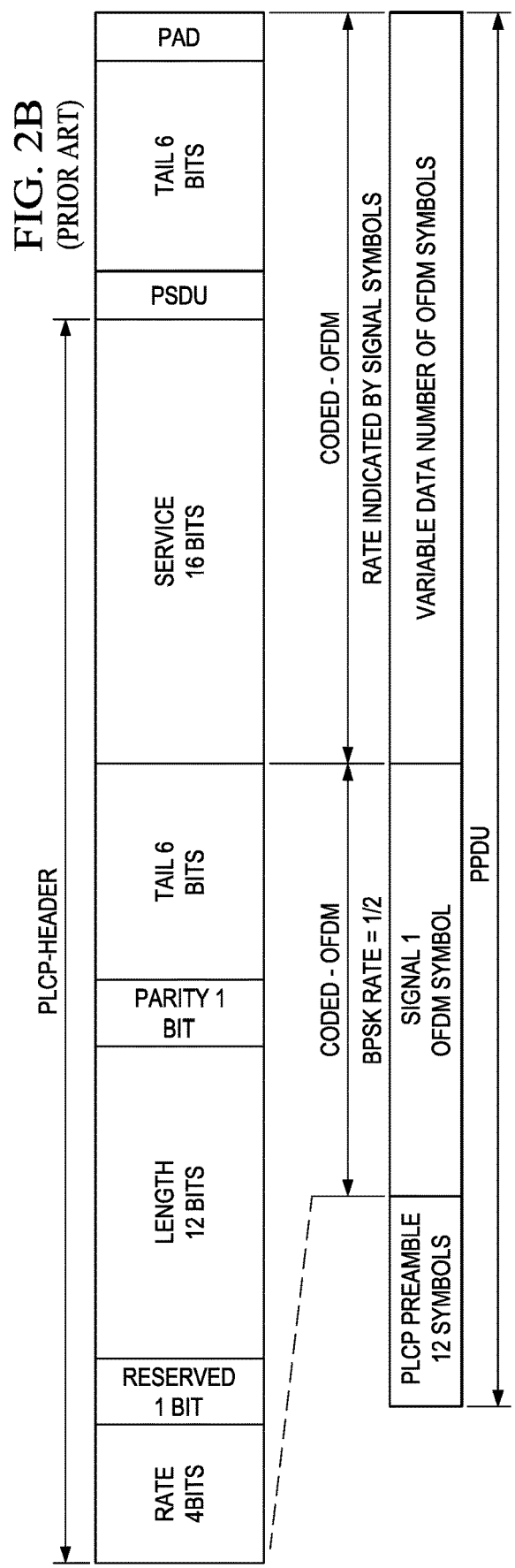
FIG. 2B shows the packet structure for an IEEE802.11 a/g/n packet.

A conventional received signal strength indicator (RSSI) can be used for detecting the packet. As known in the art, the PLCP is a kind of header that is added to packets by the PHY layer of a WLAN device. The PLCP has two main parts, a preamble and a header. The first part of the PLCP is for 'Sync' (Synchronization) and the next portion is a SFD (Start Frame Delimiter) which is a kind of tag indicating the start of physical frame and it is a specifically determined by a bit sequence. See the example PLCP headers in the packet structures shown in FIGS. 2A and 2B described below.

Step 102 comprises analyzing the packet using a preamble decode-based receive suspend algorithm which implements at least steps 103 and 104. As noted above and known in the art, algorithms such as disclosed preamble decode-based receive suspend algorithms may be implemented by hardware or be implemented by software. Regarding hardware-based implementations, algorithm equations can be converted to a logic gate pattern, such as using VHDL (a Hardware Description Language) that can then be realized using a programmable device such as a field-programmable gate array (FPGA) or a dedicated application-specific integrated circuit (ASIC) to implement the logic gate pattern. Regarding software-based implementations, code for the algorithm stored in a memory can be implemented by the processor.

Step 103 comprises analyzing a length field in the PLCP header to determine whether the packet is an undesignated packet and whether there is sufficient time remaining for implementing a turning off and turning back on the analog portion of the Rx chain of the WLAN to avoid missing a new received packet. The digital portion of the Tx chain will generally be turned off in the case the packet is undesignated regardless of the packet time remaining.

The PLCP header contains known and defined fields so that the WLAN device's PHY can parse it. The length in PHY PLCP header is generally used to determine if there is sufficient time. The turn off/on time of the Rx chain for a WLAN device is well-known and deterministic. The turn off/on time is generally by design of the PHY and can also be measured during device development. Once the turn off/on time is measured and known, the "sufficient time" can be configured accordingly through a register. For example, if the time to turn off and then turn back on a particular Rx chain is 10 μs, a sufficient time is >10 μs (e.g., 12 μs) may be used to ensure a timely turning back on to avoid not being able to detect a possible next received packet.

In step 104 if both an undesignated packet and sufficient time are present, the analog portion of the Rx chain is turned off which saves energy and extends the operating battery lifetime of the WLAN device. The Rx chain is turned off can be implemented by triggering an Rx suspend interrupt signal to the PHY layer of the WLAN device, where the PHY layer can be implemented by a finite state machine (FSM). If the packet is a non-designated packet and/or there is not sufficient time for implementing an Rx turn off and then on, the full Rx chain can be kept on and the packet reception continued.

The method can also include the step of keeping the device's Clear Channel Assessment (CCA) high and setting a duration of the interrupt signal to extend in time to the end of packet. Regarding CCA and the Network Allocation Vector (NAV), if the CCA and NAV are not updated the WLAN device Tx packet might collide with other devices (especially when sending an acknowledgement (ACK) responsive to the terminated packet). The NAV may also be set too long and hold the device Tx. In general, the CCA which is usually kept asserted by the energy of the packet, will be kept asserted in case of Rx chain suspension until a timer expiration that is set to the end of the packet. The CCA is generally in charge so that the WLAN device will avoid any Tx during reception of any packet.

The method can also include the step of responsive to the end of the packet, issuing an $R_x$ suspend stop interrupt for turning the Rx chain back on (waking back up). For turning the Rx chain back on after being turned off, an on time turn on generally using an $R_x$ suspend stop interrupt is needed because if one turns the Rx chain on too late the received packet from a peer WLAN device in the LAN network might be lost. The Rx wakeup time can be based on the packet length.

If a 'stomp and go feature' is provided for the WLAN device, while the Rx chain is on the device cannot detect an energy change and start reception of a new packet. Stomp and Go is a Texas Instruments' feature that allows the WLAN device to jump from a reception of a weak packet to the reception of a new stronger packet when the weak packet is being 'stomped' by the stronger one. The stomp and go concept is that an energy increase of say X dB is sensed during a reception of a weak packet, then this weak packet can't be received anyway and it is better for the WLAN device to try and receive the new stronger packet that might be coming from a peer WLAN device. Since it is desirable to maintain 'stomp and go' capability if provided by a WLAN device, and since stomp and go needs active reception, disclosed methods in the case of stomp and go capability do not allow Rx chain suspension in case of a weak packet because there is always a chance that a stronger packet will arrive and stomp the weak one. This is solved by allowing analog Rx chain turn off only when the received power of the packet is above a configurable level of the received signal strength indicator (RSSI).

FIG. 3 is a system block diagram representation of an example WLAN device 300 that generally conforms to the IEEE 802.11 communications standard. The WLAN device communicates in a WLAN network. The WLAN device comprises a controller 320 including a processor 325, a memory 322 including software stored in the memory for a disclosed preamble decode-based receive suspend algorithm 322a, and a transceiver 324 that is coupled to an antenna 328. The memory 322 is more generally configured to store information including data, instructions, or both. The memory 322 may be any storage medium accessible by the controller 320, such as a read only memory (ROM), a random access memory (RAM), a register, cache memory, or magnetic media device such as internal hard disks and removable disks. A phase lock loop (PLL) 332 is also provided for purposes including mixing and frequency synthesis.

The WLAN device 300 is also shown including hardware comprising digital logic 334 that can also be for implementing a disclosed preamble decode-based receive suspend algorithm. However, as noted above, the algorithm 322a as shown in FIG. 3 may also be implemented by software stored in a memory such as memory 322 by the processor 325.

The controller 320 is coupled to the memory 322 and to the transceiver 324. In some implementations, the transceiver 324 comprises baseband units (not shown) and analog units (not shown) to transmit and receive RF signals. The baseband unit may comprise hardware to perform baseband signal processing including digital signal processing, coding and decoding, modulation, and demodulation. The analog unit may comprise hardware to perform analog to digital conversion (ADC), digital to analog conversion (DAC), filtering, gain adjusting, up-conversion, and down-conversion. The analog unit may receive RF signals from an access point and down-convert the received RF signals to baseband signals to be processed by the baseband unit, or receive baseband signals from the baseband unit and up-convert the received baseband signals to RF wireless signals for uplink transmission. The analog unit comprises a mixer to up-convert the baseband signals and down-convert the RF signals with a carrier signal oscillated at a radio frequency of the WLAN system. The radio frequency may be 2.4 GHz or 5 GHz utilized in WLAN systems conforming to 802.11a/b/g/n/ac specifications, or other specifications depending on future radio access technology.

Figure 4A:
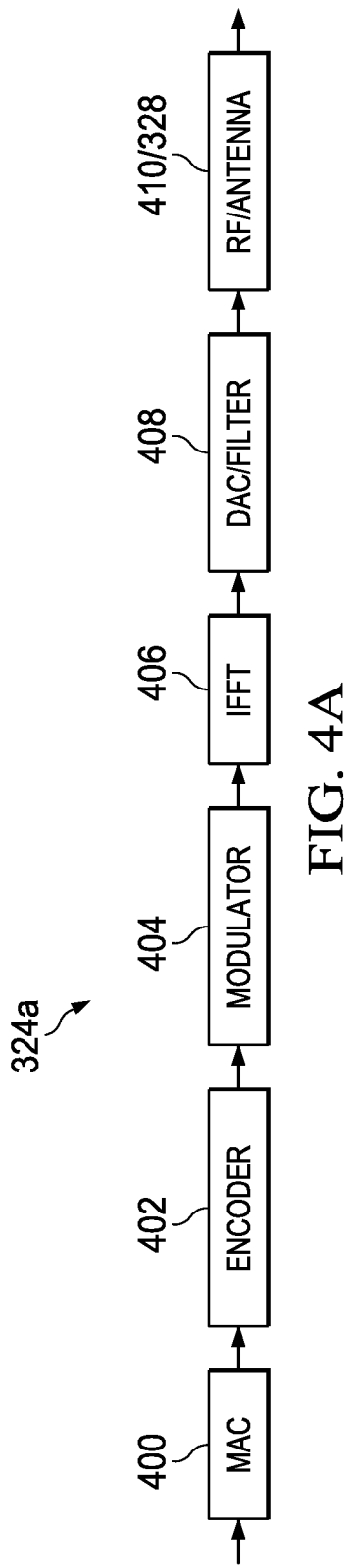
FIG. 4A is a block diagram of an example transmitter for a disclosed WLAN device, according to an example embodiment.

FIG. 4A is a block diagram of an example transmitter 324a portion of the transceiver 324 shown in FIG. 3. The transmitter 324a is shown comprising a MAC module 400, an encoder 402, a modulator 404, an Inverse Fast Fourier Transform (IFFT) unit 406, a DAC/filter module 408, and an RF/antenna module 410/328. The transmitter 324a can produce outgoing RF signals in one or more frequency ranges to be transmitted over one or more communication channels. The frequency range can include a group of OFDM subcarriers.

The MAC module 400 may include one or more MAC control units (MCUs) to produce and pass MAC Protocol Data Units (MPDU), corresponding preamble and header data streams to the encoder 402, which may perform Forward Error Correction encoding thereto to produce respective encoded data stream. Forward Error Correction (or channel coding) adds redundant data providing error control for data transmission to a message to be transmitted. The FEC codes may be a block code or a convolutional code. The block code comprises a fixed size block of symbols. The convolutional code comprises symbol streams of predetermined or arbitrary length. The modulator 404 performs modulation schemes on the encoded data streams according to the data type to produce modulated data streams to the IFFT module 406. The modulation schemes can comprise, for example, Phase-Shift Keying (PSK), a Frequency Shift Keying (FSK), an Amplitude Shift Keying (ASK), or Quadrature Amplitude Modulation (QAM).

The IFFT module 406 can further include an OFDMA module, where the OFDMA module maps different modulated streams to different subcarrier groups before IFFT processing. In some implementations, the IFFT module 406 may perform an IFFT on outputs of the modulator 404 to generate one or more time domain signals associated with one or more frequency range. In some implementations, the IFFT module 406 can be configured to use one or more FFT bandwidth frequencies such as 20 MHz, 40 MHz, 80 MHz, or 160 MHz. In some implementations, the IFFT module 406 may perform different IFFTs on the modulated data streams according to different FFT bandwidths. Next, the DAC/filter module 408 converts the time domain signal to an analog signal and shapes the analog signal for transmission via the RF/antenna module 410/328. The RF/antenna module 410/328 comprises one or more up converters (not shown) that up-convert the analog signals to corresponding frequency bands for the transmitter antennas to perform transmission.

Figure 4B:
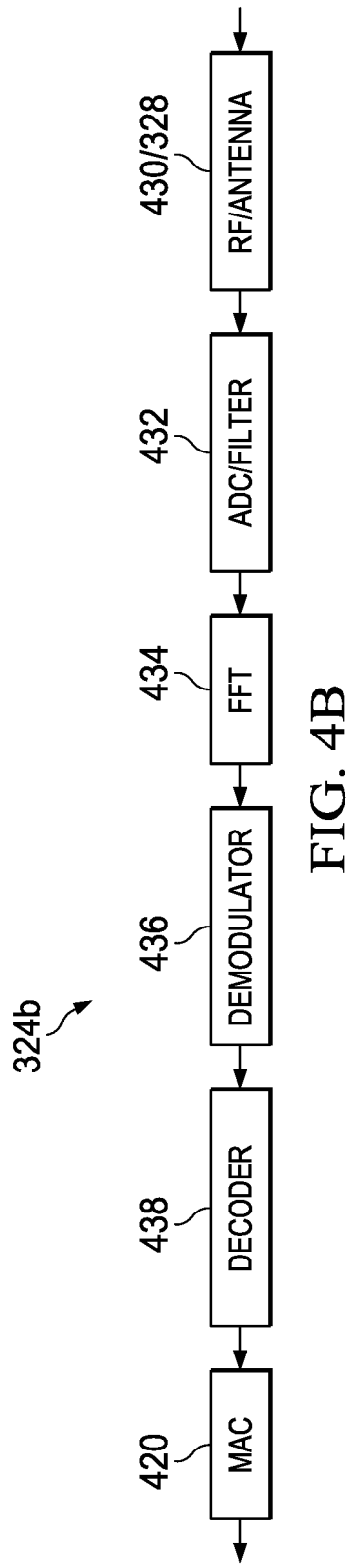
FIG. 4B is a block diagram of an example receiver for a disclosed WLAN device, according to an example embodiment.

FIG. 4B is a block diagram of an example receiver 324b portion of the transceiver 324 shown in FIG. 3. The receiver 324b comprises an RF/antenna unit 430/328, an ADC/filter unit 432, a FFT unit 434, a demodulator 436, a decoder 438, and a MAC module 420. The RF/antenna unit 430/328 is coupled to the ADC/filter unit 432, the FFT unit 434, the demodulator 436, the decoder 438, and then to the MAC module 420.

In operation the receiver 324b receives incoming RF signals in one or more frequency ranges over one or more communication channels. The frequency range can include a group of OFDM sub-carriers. The receiver 324b performs signal processing to received data packets in a reverse order to the transmitter 324a to recover the information therein. The receiver 324b is generally capable of detecting a data type of various WLAN generations including IEEE 802.11a/b/g (legacy), IEEE 802.11n, IEEE 802.11ac, or a future WLAN generation based on the signal field in the received data packet.

The RF/antenna 430/328 retrieves the incoming signal comprising the PPDU, and performs down-conversion. The ADC/filter unit 432 filters the down-converted signal and transforms which into digital data sequence. The FFT unit 434 transforms the digital data sequence to a frequency domain data sequence. The demodulator 436 determines the modulation type of the symbols in the frequency domain data sequence, thereby determining the WLAN generation of the received data, and demodulates the payload data field.

Some implementation challenges for disclosed embodiments are due to real-time Rx chain termination with MAC layer and PHY layer involvement. There is a challenge with termination duration calculation and the update to PHY (CCA) and to MAC (NAV). Disclosed treatment can comprise a standard MAC-PHY interrupt, part of a finite-state machine (FSM) so that no NAV updating is needed.

Both MAC layer and modem implementations are possible for disclosed preamble decode-based receive suspend during undesired packets. For the MAC layer implementation a filtering scheme (destination address (DA), Network Allocation Vector (NAV), or RSSI) can be implemented in the MAC scripter. The suspend recommendation can be performed through an open core protocol (OCP) interface command to a MAC register asserting a PHY signal.

For the modem implementation, an interrupt to the PHY event handler can be initiated to shut down the Rx chain and enter an Rx suspend state. The frequency domain (FD) part in the modem can be shut down to save current in TD while still allowing symbol counter and CCA to continue operation. The QUAL CCA can be kept high for the rest of the packet to prevent Tx. An Rx abort command can be sent from the PHY to the MAC in order to 'clean' the suspended packet from the MAC. An interrupt for Rx suspend stop to the PHY event handler can be set once packet is over. The same timer can hold the QUAL CCA high for the rest of the packet in order to prevent any Tx during that time.

Disclosed embodiments are particularly useful and relevant to packet-based wireless local area networks. For example, for IEEE 802.11-based networks for WLAN devices. Significantly, disclosed solutions can be implemented by hardware or by software on top of the various 802.11 protocols w/o causing any protocol violation enabling a direct plug-in.

EXAMPLES

Disclosed embodiments are further illustrated by the following specific Examples, which should not be construed as limiting the scope or content of this Disclosure in any way.

One of the demanding and common PHY states of the WLAN device is the Rx state. The Rx state is the combination of two sub-states, being the Rx search when WLAN device is waiting and searching for a new packet to start, and the Rx active for active Rx packet reception. The WLAN device will switch from an Rx search state into an Rx active state for OFDM packet detection or for barker sync. The WLAN device will also turn off the Rx chain only as part of the Rx suspension or when switching to the Tx mode. The WLAN device will switch modes from Rx active to Rx suspend and back to Rx search once the Rx packet duration has expired. The WLAN device will enter idle mode responsive to undesignated received packets if other conditions as described above are satisfied.

The Estimateda general idea of the targeted current consumption for the Rx and idle states, and the expected static current saving by switching from Rx to idle states. The idle state has non-zero current used due to the processor running, the memories kept on, some portion of the digital portion of the Rx chain also being kept on.

| State | Expected current |
| --- | --- |
| Idle | ~5.5 mA |
| Rx search | ~21 mA |
| Rx active | ~25 mA |

Estimated Current Consumption Numbers for Rx and Idle PHY States

There can be three different levels of suspension of the packet depending on the time left until the end of the packet and the possible need for supporting stomp and go capability (if provided by the WLAN device).

1. Turn off only the FD part of the WLAN device and leave the analog portion of the Rx chain and part of the time domain (TD) part of the WLAN device 'on'. This will not allow packet decoding but it will allow energy detection and will also allow stomp and go. This transition is not relatively highly power efficient and may save an estimated 4 mA to 5 mA during the packet reception.
2. Turn off both the FD and analog Rx chain portion and move into the idle mode for the packet duration. This will save the current, but will not allow using the stomp and go feature during that packet since the device is totally 'deaf'.
3. Turn off the FD part, the analog Rx chain, and also the RF PLL. This can be performed only in cases there is enough time before end of packet to turn the PLL off and back on to avoid not being able to detect a possible next received packet.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method comprising:
   receiving, by a device, a packet comprising a Physical Layer Convergence Protocol (PLCP) header comprising a length field;
   determining, by the device, whether the packet is undesignated with respect to the device, based on the length field;
   determining, by the device, whether time remaining for turning off and on a first portion of a receive chain of the device is greater than a threshold, based on the length field of the PLCP header of the packet; and
   turning off the first portion of the receive chain, in response to determining that the packet is undesignated and determining that the time remaining for turning off and on the first portion of the receive chain of the device is greater than the threshold.

2. The method of claim 1, wherein the threshold is 10 μs.

3. The method of claim 1, further comprising turning on the first portion of the receive chain a period of time after turning off the first portion of the receive chain, based on the length field of the PLCP header.

4. The method of claim 1, wherein turning off the first portion of the receive chain comprises sending a receive interrupt signal to a physical (PHY) layer of the device.

5. The method of claim 1, wherein the device comprises at least one processor.

6. The method of claim 1, wherein the device comprises digital logic.

7. The method of claim 1, wherein the receive chain includes an analog portion and a digital portion and the first portion includes the analog portion.

8. A method comprising:
   receiving, by a device, a packet comprising a Physical Layer Convergence Protocol (PLCP) header comprising a length field;
   determining, by the device, whether time remaining for turning off and on a first portion of a receive chain of the device is greater than a threshold, based on the length field of the PLOP header of the packet;
   turning off the first portion of the receive chain, in response to determining that the time remaining for turning off and on the first portion of the receive chain of the device is greater than the threshold, wherein turning off the first portion of the receive chain comprises sending a receive interrupt signal to a physical (PHY) layer of the device;
   maintaining a high Clear Channel Assessment (CCA) setting while the first portion of the receive chain is off;
   setting the receive interrupt signal to extend to an end of the packet; and
   issuing a receive suspend interrupt for turning on the first portion of the receive chain, in response to detecting the end of the packet.

9. A method comprising:
   receiving, by a device, a packet comprising a Physical Layer Convergence Protocol (PLCP) header comprising a length field;
   determining, by the device, whether the packet is undesignated, based on the length field of the PLCP header of the packet, wherein the packet is undesignated when the packet cannot be successfully decoded by the device due to including at least one of an;
   unsupported wireless local area network (WLAN) protocol or an unsupported channel rate; and
   turning off a first portion of a receive chain, in response to determining that the packet is undesignated.

10. The method of claim 9, further comprising determining whether time remaining for turning off and on the first portion of the receive chain of the device is greater than a threshold, based on the length field of the PLCP header of the packet, and wherein turning off the first portion of the receive chain is performed in response to determining that the packet is an undesignated packet and that the time remaining for turning off and on the first portion of the receive chain of the device is greater than the threshold.

11. The method of claim 9, wherein the packet is undesignated further when the packet has a wrong destination address.

12. The method of claim 9, further comprising turning on the first portion of the receive chain a period of time after turning off the first portion of the receive chain, based on the length field of the PLCP header.

13. The method of claim 9, wherein turning off the first portion of the receive chain comprises sending a receive interrupt signal to a physical (PHY) layer of the device.

14. The method of claim 13, further comprising:
   maintaining a high Clear Channel Assessment (CCA) setting while the first portion of the receive chain is off;
   setting the receive interrupt signal to extend to an end of the packet; and
   issuing a receive suspend interrupt for turning on the first portion of the receive chain, in response to detecting the end of the packet.

15. The method of claim 9, wherein the device comprises at least one processor.

16. The method of claim 9, wherein the device comprises digital logic.

17. A device comprising:
   a transceiver comprising a receive chain that includes an analog portion and a digital portion, the transceiver configured to receive a packet comprising a Physical Layer Convergence Protocol (PLCP) header comprising a length field;
   at least one processor coupled to the transceiver; and
   a non-transitory computer readable storage medium storing a program for execution by the at least one processor, the program including instructions to cause the at least one processor to:
      determine whether the packet is undesignated with respect to the device, based on the length field of the PLOP header of the packet;
      determine whether time remaining for turning off and on a first portion of the receive chain of the device is greater than a threshold, based on the length field of the PLOP header of the packet; and
      cause the first portion of the receive chain to turn off, in response to determining that the packet is undesignated and determining that the time remaining for turning off and on the first portion of the receive chain of the device is greater than the threshold.

18. The device of claim 17, wherein the instructions further comprise instructions to turn on the first portion of the receive chain a period of time after turning off the first portion of the receive chain, based on the length field of the PLCP header.

19. The device of claim 17, wherein:
   the first portion includes the analog portion of the receive chain; and
   the program includes further instructions to cause the digital portion of the receive chain to turn off in response to determining that the packet is undesignated.

20. The device of claim 19, wherein the instructions cause the digital portion of the receive chain to turn off without causing the analog portion of the receive chain to turn off, in response to determining that the packet is undesignated and determining that the time remaining for turning off and on the analog portion of the receive chain of the device is less than the threshold.

* * * * *